United States Patent
Reichert

(10) Patent No.: US 7,602,173 B2
(45) Date of Patent: Oct. 13, 2009

(54) SENSOR SYSTEM FOR DETECTING A DIFFERENTIAL ANGLE

(75) Inventor: Andreas Reichert, Oberstenfeld (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/815,166

(22) PCT Filed: May 22, 2006

(86) PCT No.: PCT/EP2006/062482

§ 371 (c)(1),
(2), (4) Date: Jul. 31, 2007

(87) PCT Pub. No.: WO2007/003468

PCT Pub. Date: Jan. 11, 2007

(65) Prior Publication Data

US 2008/0258715 A1    Oct. 23, 2008

(30) Foreign Application Priority Data

Jul. 4, 2005   (DE) .................. 10 2005 031 086

(51) Int. Cl.
*G01B 7/14*   (2006.01)
*G01B 7/30*   (2006.01)

(52) U.S. Cl. ............... 324/207.13; 324/207.25

(58) Field of Classification Search ............ 324/207.13, 324/207.25, 174; 73/514.31, 514.39, 862.69, 73/862, 192, 193; 702/151
See application file for complete search history.

(56) References Cited

U.S. PATENT DOCUMENTS

| 7,028,545 B2 | 4/2006 | Gandel et al. |
| 2004/0194560 A1 | 10/2004 | Froehlich et al. |
| 2006/0123903 A1 | 6/2006 | Gandel et al. |

FOREIGN PATENT DOCUMENTS

| DE | 202 20 388 | 8/2003 |
| GB | 2 379 277 | 3/2003 |
| JP | 06011402 | 1/1994 |
| JP | 06011402 A * | 1/1994 |
| WO | 02/071019 | 9/2002 |

OTHER PUBLICATIONS

Morita et al, Torque Sensor, English Partial Translation of JP 06011402 A, Japan, Jan. 1994.*

* cited by examiner

*Primary Examiner*—Bot L LeDynh
(74) *Attorney, Agent, or Firm*—Michael J. Striker

(57) ABSTRACT

The invention relates to a sensor arrangement for detecting a difference angle, comprising at least one magnet field-sensitive sensor element (12), with which the magnetic field information of a magnetic circuit, consisting of a magnetic pole wheel (10) and of ferromagnetic flux rings (14, 16) with teeth (18, 20), can he evaluated. The invention is characterized in that the teeth (18, 20) extend in a radial direction for radially tapping the magnetic field information of the magnetic pole wheel (10).

11 Claims, 4 Drawing Sheets

SENSOR SYSTEM FOR DETECTING A DIFFERENTIAL ANGLE

The invention relates to a sensor system for detecting a differential angle, in particular for detecting a differential angle that is caused by a torque acting on a shaft and that can be detected with a sensor that is sensitive to a magnetic field.

Sensor systems of this kind are used to detect the differential angle in various applications, for example in motor vehicles, and are used to detect the torque acting on a rotating shaft. For example, Hall effect-based sensors can detect magnetic field changes that are caused by the angle change or torque.

In particular, motor vehicles with electrically assisted steering systems generally require a torque signal that can serve as a control variable for assisting the driver in steering the vehicle.

EP 1 269 133 B1 describes a magnetic device that is able to generate a torque signal. The magnetic circuit of the device is composed of a magnet ring, two flux rings, and one or more Hall elements. Rotating the magnet in the flux rings causes a change in the magnetic field intensity between the flux rings, which is measured with one or more Hall elements. The teeth connected to the respective flux rings interlock with one another in the axial direction and read the magnetic field information at the circumference in order to then supply it to the Hall element. The geometry is therefore relatively insensitive in the tangential and radial directions. Axial tolerances of the Hall elements in relation to the flux rings, however, have a serious impact on the measuring effect. Thus an increase in the air gap yields a reduced magnetic flux with a disadvantageous effect on the torque sensor.

DE 202 20 388 U1 has disclosed another magnetic device for torque determination in which the two flux rings are embodied as tubular. Since the radial distance between the tubes is embodied to be approximately uniform, the magnet is relatively large, which leads to difficulties in the through magnetization and pole isolation of the magnet. The use of a magnetic yoke plate, which increases the magnetic flux by short-circuiting the magnetic pole at the rear, is not provided, thus rendering the sensor susceptible to external interference fields. In addition, there is an increase in the air gaps between the flux tubes and the magnet since the two tubes, each with its own eccentricity and tolerances, must be moved over the magnet.

SUMMARY OF THE INVENTION

The object of the invention is to minimize the above-mentioned disadvantages of the prior art. According to the invention, the flux rings, preferably equipped with reciprocally interlocking teeth, collect the magnetic information of the magnetic pole wheel at its end surface. The teeth of the flux rings are radially oriented. The magnetic pole wheel is situated so that its magnetic information can be read from the radially oriented teeth in order to generate a magnetic flux circuit. Preferably, the flux rings have different radii; the teeth connected to the respective flux rings interlock with one another. The length of the teeth in the radial direction here is selected so that they reliably overlap the magnets of the magnetic pole wheel magnetically in the radial direction. In addition, both of the flux rings, due to tolerances in the axial direction, can dip between the collecting plates without significantly changing the magnetic flux. The sensor system according to the invention produces an optimized tolerance behavior of the magnetic circuit in the axial direction. Mechanical movements in the axial direction therefore have less of an effect on the quality of the signal detection. The above-mentioned system also has a simpler assembly since all of the components can be installed from one side.

This design also makes it easily possible to use magnetic yoke plates in order to make the sensor more resistant to external interference fields by increasing the magnetic flux.

Other suitable modifications ensue from other dependent claims and the description.

BRIEF DESCRIPTION OF THE DRAWINGS

Exemplary embodiments of the invention will be explained in detail in conjunction with the drawings.

DETAILED DESCRIPTION OF THE EXEMPLARY EMBODIMENTS

Figure 1:
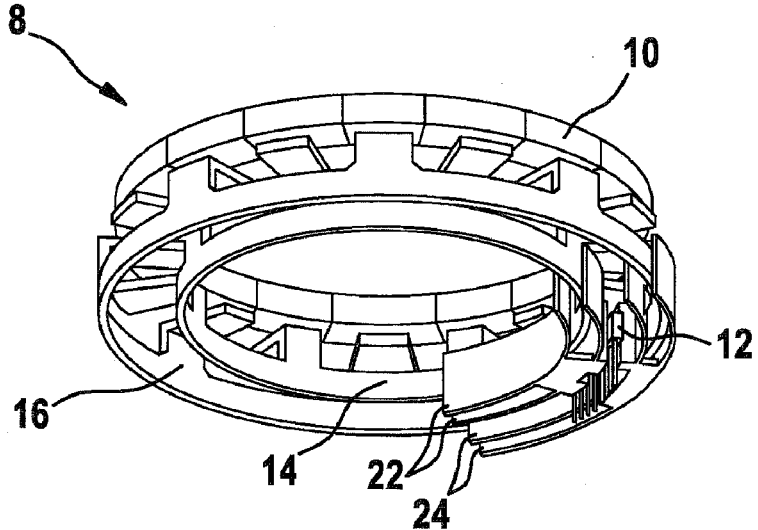
FIG. 1 is a perspective depiction of the components of the sensor system.
Figure 2:
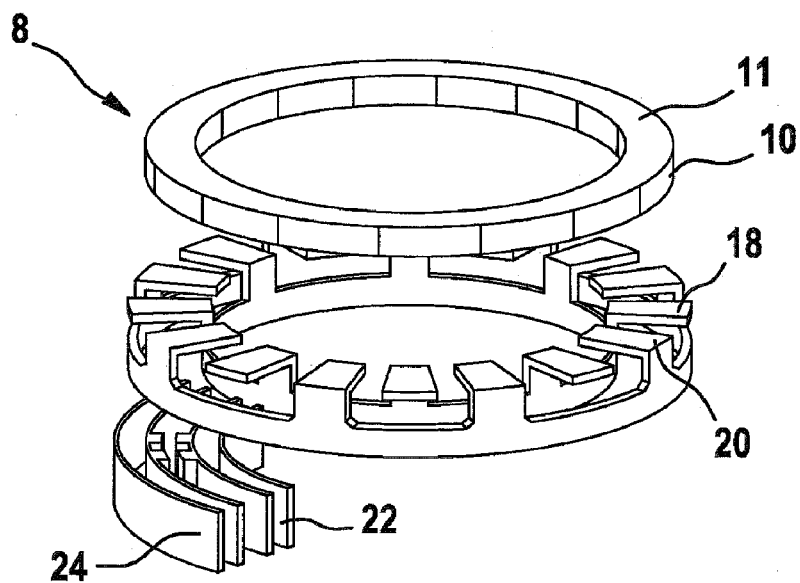
FIG. 2 is an exploded view of the sensor components.
Figure 3:
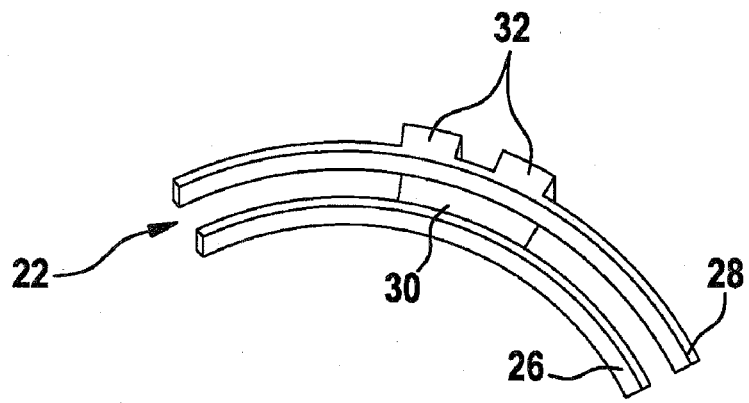
FIG. 3 shows magnetic flux collecting elements.
Figure 7:
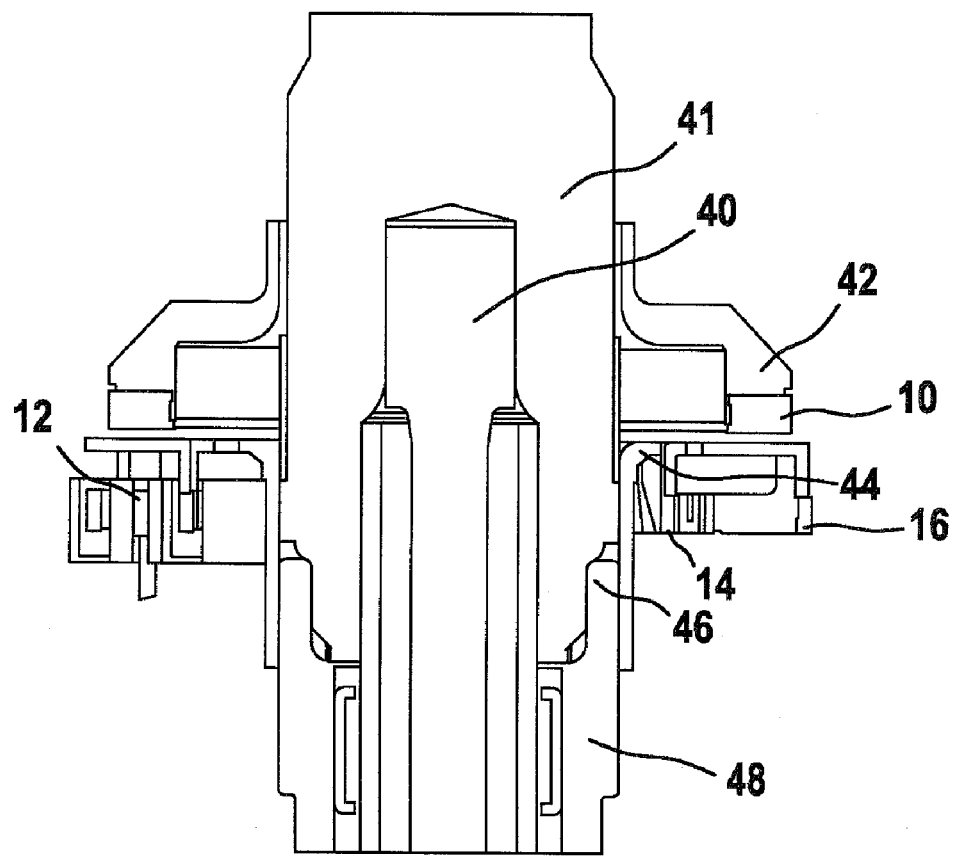
FIG. 7 shows a section through the sensor system.
Figure 8:
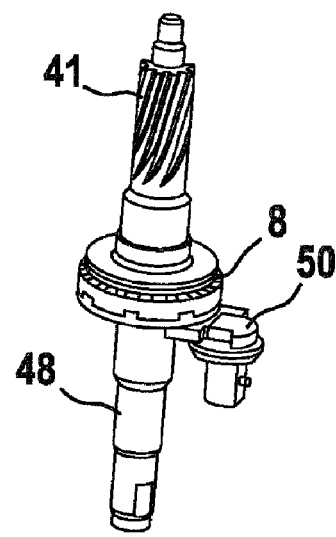
FIG. 8 is a perspective view of the sensor system fastened to the shaft.

FIG. 1 shows the components of a sensor system 8. A magnetic pole wheel 10 and a magnetic flux yoke element 11 are connected to a first shaft 41 that is not shown. A second shaft 48, as shown by way of example in FIGS. 7 and 8, is connected to a first flux ring 14 and second flux ring 16. The axis of the shafts 41, 48 defines an axial direction, with a radial direction being defined in relation to the rotation axes of the shafts 41, 48. The first flux ring 14 is situated on an inner radius and is encompassed by a second flux ring 16 situated on an outer radius. Extending from the first flux ring 14, first teeth 18 are provided at regular intervals in the circumference direction and extend outward in the radial direction from the diameter of the first flux ring. In addition, the second flux ring 16 has second teeth 20 extending from it at regular intervals that are likewise oriented in the radial direction. The second teeth 20 have the same axial spacing from the magnetic pole wheel 10 as the first teeth 18. The distances between the teeth 18, 20 are selected so that the first teeth 18 and second teeth 20 interlock with one another. The distance between the first teeth 18 and adjacent second teeth 20 is selected so that it essentially corresponds to the geometry of the magnets of the magnetic pole wheel 10, i.e. to the distance from the center of a north pole magnet segment to the center of a south pole magnet segment. Between the first flux ring 14 and second flux ring 16, at least one sensor element 12 is provided for detecting the magnetic field. In the region of the sensor element 12, a first magnetic flux collecting element 22 is provided, comprised of a first shell 26 and second shell 28 that are situated respectively inside and outside the first flux ring 14, extending parallel to it in the form of circular segments. A second magnetic flux collecting element 24 is likewise situated extending in the same fashion in relation to the second flux ring 16. The two magnetic flux collecting elements 22, 24 are embodied in the form of circular segments, i.e. are essentially ring-shaped, as shown in FIGS. 1-3.

The first magnetic flux collecting element 22 is composed of a first shell 26 and a second shell 28 that are connected to each other mechanically and magnetically by means of a magnetic flux element 30. This magnetic flux element 30 is spaced axially apart from the flux ring 14 in order to be able to accommodate the axial tolerances of the flux ring 14. The radius of the two shells 26, 28 here is selected so that the first flux ring 14 can be placed between them. The shell 28 oriented toward the sensor element 12 has two preferably flat tapered elements 32 attached to it, via which the magnetic flux is supplied to the first sensor element 12 and to a second one. The two magnetic flux collecting elements 22, 24 serve to remove heat from the sensor elements 12 since their tapered elements 32 are preferably embodied as fully contacting the sensor elements 12. As is clear from FIG. 2, the second magnetic flux conducting element 24 also has tapered elements 32 on the shell oriented toward the sensor elements 12.

Figure 4A:
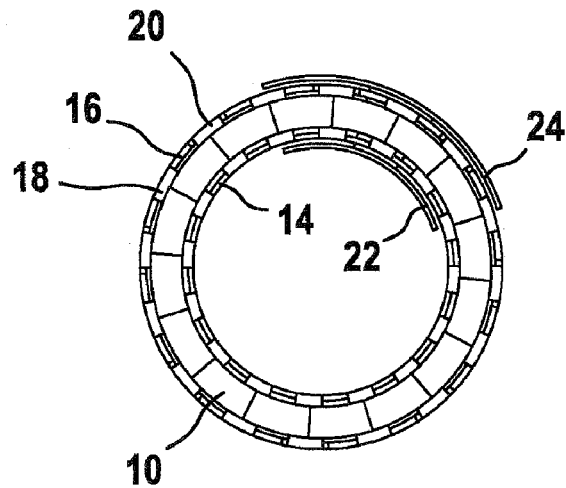
FIG. 4a is a top view of the magnetic zero position of the teeth in relation to the magnet.
Figure 4B:
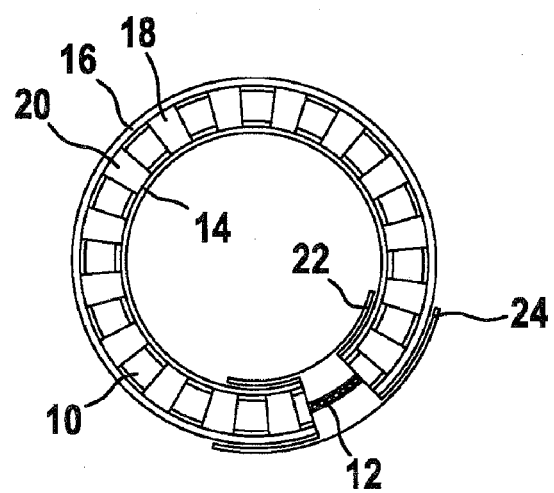
FIG. 4b is a bottom view of the magnetic zero position of the teeth in relation to the magnet.

FIGS. 4a and 4b show the magnetic zero position of the teeth 18, 20 in relation to the magnets of the magnetic pole wheel 10, viewed from above and below. The varying coloring of the magnetic pole wheel 10 should indicate that magnetic south poles and north poles are situated in alternation with one another. In the magnetic zero position, the teeth 18, 20 are situated in the middles of the magnetic pole transition, i.e. the centers of the teeth 18, 20 are situated precisely at the transition from south pole to north pole. As a result, the same magnetic potential difference is present in the two flux rings 14, 16. Therefore the field intensity in the gap between the first flux ring 14 and second flux ring 16 is zero mT.

Figure 5:
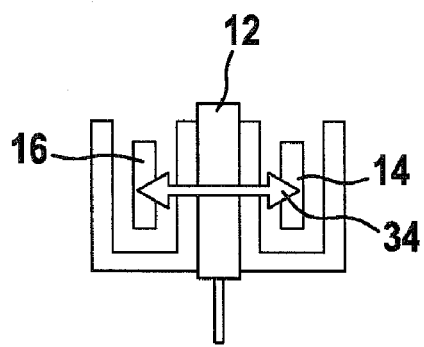
FIGS. 5 and 6 show sectional views for explanation of an exemplary embodiment with an axial shift of the intermediate pieces of the flux rings in order to reduce the magnetic shunting between the flux rings.
Figure 6:
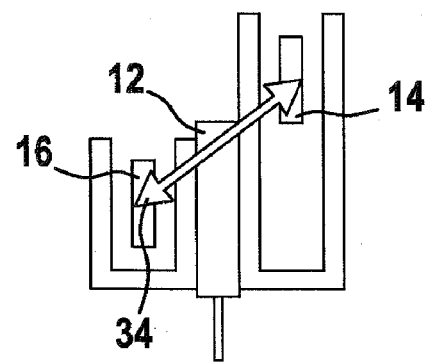

In the exemplary embodiment shown in FIGS. 5 and 6, a step has been taken to reduce the magnetic shunting. The magnetic shunting can be reduced by increasing the distance 34 between the first and second flux rings 14, 16 and the corresponding intermediate pieces of the flux rings 14, 15. This is achieved by axially shifting the flux ring intermediate pieces so as to increase the magnetic shunting resistance.

In order to measure a torque, one end of the torque shaft 40 is connected to the magnetic pole wheel 10 via a magnetic pole holder 42 and is connected to the first shaft 41. A flux ring holder 44 with the integrated flux rings 14, 16 is attached to the other end of the torque shaft 40 by means of the second shaft 48. FIG. 8 shows a corresponding arrangement in which the sensor system 8 is provided with a sensor module 50 into which the sensor elements 12 and magnetic flux collecting elements 22, 24 are integrated.

Figure 9:
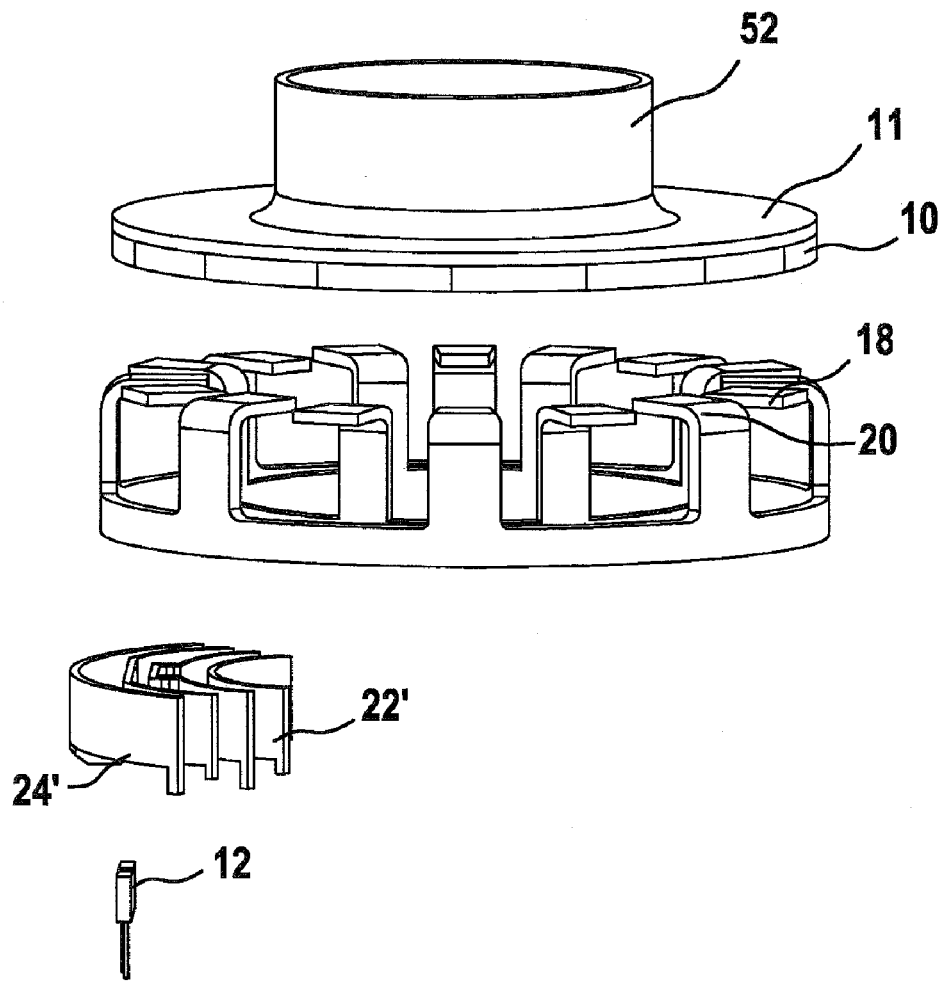
FIG. 9 is an exploded view of the sensor components of an alternative exemplary embodiment.
Figure 10:
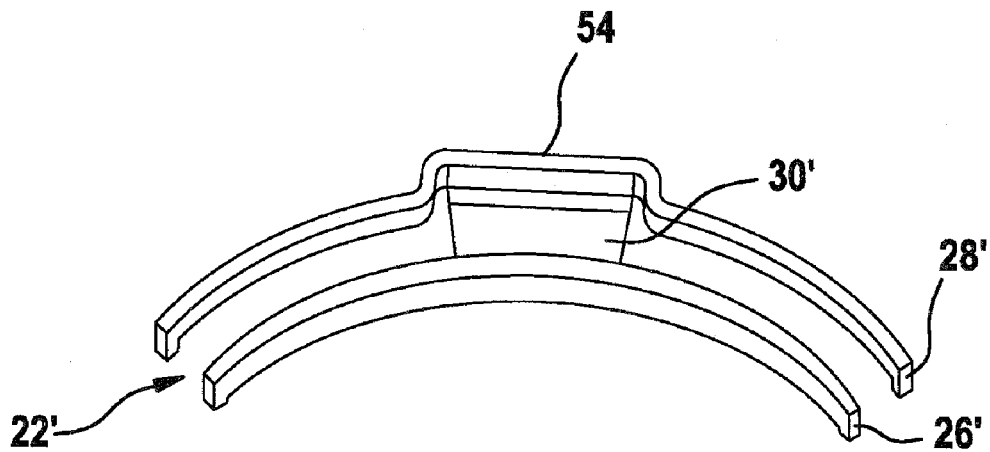
FIG. 10 shows the magnetic flux collecting elements of the alternative exemplary embodiment.

The alternative exemplary embodiment shown in FIGS. 9 and 10 differs from the one in FIGS. 1 through 8 on the one hand in that in this instance, a sleeve 52 is provided, which is connected to the magnetic flux yoke element 11. Preferably, the sleeve 52 and the magnetic flux yoke element 11 are part of a single component. In this case, the sleeve 52 serves to attach the magnetic pole wheel 10 to the first shaft 41. In addition, the second shell 28' of the first magnetic flux collecting element 22' has a molded component 54 that is offset in the radial direction in relation to the circular segment-shaped structure of the second shell 28'. This molded component 54 performs the function of the tapered elements 32 of the first exemplary embodiment. The shape of the molded element 54 is adapted to the adjacent surface of the sensor element 12, in the current example, a flat surface. In a corresponding way, the shell situated closest to the sensor element has a corresponding molded component for conducting the collected magnetic flux as well as the heat produced by the sensor element 12.

The exemplary embodiments shown in the drawings function as follows. If a torque is generated between the first shaft 41 and second shaft 48, then this twists the torque shaft 40. This produces an angular difference between the magnetic pole wheel 10 and the flux rings 14, 16. This angular difference generates a magnetic field intensity change in the vicinity of the sensor element 12, which can be converted into a torque-dependent electrical signal. A bearing 46 between the two shafts 41, 48 can positively influence the air gap tolerances. The magnetic field of the magnetic pole wheel 10 is then read both at the end surface and radially in that the first and second teeth 18, 20 are oriented in the radial direction and lie essentially on the same radius as the magnets of the magnetic pole wheel 10. The surfaces of the reciprocally interlocking first and second teeth 18, 20, which are oriented toward the magnetic pole wheel 10, stop essentially the same axial distance away from the magnetic pole wheel 10. Thanks to the radial reading of the magnetic field of the magnetic pole wheel 10, an axial offset does not have a serious effect with regard to the torsion to be evaluated between the magnetic pole wheel 10 and flux rings 14, 16. This improves the properties of the sensor system 8 since it reduces mechanical movements in the axial direction and tolerances between the teeth 18, 20 and the magnetic pole 10.

The magnetic flux collecting elements 22, 44 are positioned as stationary in relation to the corresponding flux rings 14, 16, i.e. the flux rings 14, 16 can freely rotate around the rotation axis without affecting the stationary position of the magnetic flux collecting elements 22, 24. Between the two magnetic flux collecting elements 22, 24, there are sensor elements 12, which are likewise placed in stationary fashion between the collecting elements 22, 24 in order to measure the variation of the magnetic field intensity. According to FIG. 8, these stationary components (sensor elements 12, magnetic flux collecting elements 22, 24) are integrated into the sensor module 50. A magnetic flux collecting element 22, 24 is composed of two shells 26, 28 that are situated in the radial direction inside and outside the respective flux ring 14, 16. Oriented toward the sensor elements 12, these shell elements 26, 28 each have a tapered element 32 in order to divert the magnetic flux in a targeted fashion via the sensor elements 12. The form of the tapered element 32 here is adapted to that of the section of the sensor element 12 situated in the immediate vicinity of the tapered element 32. In addition to the function of supplying magnetic flux in a targeted fashion, the tapered element 32 also cooperates with the shells 26, 28 to function as a heat sink for the sensor element 12. To this end, the spacing between the tapering element 32 and the sensor element 12 can be selected so that they contact each other directly or the distance can be selected as at least very slight, for example between 0.5 and 0 mm. The heat of the sensor element 12 is in particular absorbed by the shells 26, 28. Alternatively, the molded component 54 shown in FIGS. 9 and 10 can be used, which assumes the function of the tapered element, but is easier to manufacture.

Between the shells 26, 28, a magnetic flux element 30 is provided, which mechanically and magnetically connects the two shells 26, 28 to each other. In conventional steering gear bearings, axial shifts and tolerance are higher in magnitude than radial or tangential ones because the bearings have a lower rigidity in the axial direction. The distance of the magnetic flux element 30 from the respective flux ring 14, 16 in the axial direction is selected so as to permit compensation for tolerances in the axial direction. For example, the distance is on the order of magnitude of between 1 and 2 mm. The magnetic flux element 30 therefore does not serve to collect the magnetic flux since it is too far away from the flux ring 14, 16. It is provided in particular to conduct the magnetic flux from the first shell 26 to the second shell 28 in order to supply it via the tapered element 32 to the sensor element 12 for further evaluation.

The orientation of the teeth 18, 20 both radially and at the end surface in relation to the magnetic pole wheel 10 makes it possible to align these elements precisely, with a definite air gap in relation to one another. This reduces the air gap, which has a positive effect on the overall magnetic flux and on the rotation modulation. The teeth 18, 20 of the two flux rings 14, 16 preferably lie on the same plane, interlock with one another, and are radially oriented. A radial movement between the flux rings 14, 16 and the magnetic pole wheel 10 produces hardly any change in the magnetic flux since the teeth 18, 20 radially overlap the magnets of the magnetic pole wheel 10 and therefore this radial movement does cause a change in the air gap. Since the teeth 18, 20 of the flux rings 14, 16 are positioned on the end surface in relation to the magnets of the magnetic pole wheel 10, it is possible to integrate the magnetic flux yoke element 11 into the side of the magnetic pole wheel 10 oriented away from the teeth 18, 20, thus increasing the overall magnetic flux and making the system more resistant to external magnetic interference fields.

The shell design 26, 28 of the magnetic flux collecting elements 22, 24 makes it possible for the corresponding flux ring 14, 16 to dip into the magnetic flux collecting element 22, 24 in the axial direction. As a result, an axial movement of the flux rings 14, 16 in relation to the magnetic flux collecting element 22, 24 can be compensated for without influencing the magnetic flux. In addition, the magnetic shunting can be reduced by increasing the distance between the two intermediate pieces of the flux rings 14, 16. Axially shifting the intermediate pieces of the flux rings 14, 16 increases the distance and therefore the magnetic shunting resistance. If the flux rings 14, 16 are extrusion coated together with the flux ring holder 44, then there is no weld point in the rotation region of the stationary sensor element 12 because no radial sliding elements have to be used in the molding die. This makes it possible to avoid the production of plastic flash that such a tubular attachment can cause. As a result, the sensor element 12 does not jam in the air gap of the flux rings 14, 16. Another advantage of this embodiment is the reduction of the quantity of material used to produce the flux rings 14, 16 since it is not necessary for a circular geometry to be stamped from a plate, which would generate more scrap. After the stamping, the sheet metal sections are bent and their ends are attached to a flux ring 14, 16. The flux rings 14, 16 (e.g. NiFe-filled plastic) and their flux ring holder 44 can be simultaneously extrusion coated in a two-component injection molding die. This permits the achievement of a highly precise positioning between the flux rings 14, 16. This structural design makes it possible for the assembly of the entire sensor system 8, together with the magnets of the magnetic pole wheel 10 and flux rings 14, 16, to occur in the axial direction. A different assembly direction is not necessary.

What is claimed is:

1. A sensor system for detecting a differential angle, comprising at least one magnetic field-sensitive sensor element (12) that is able to evaluate the magnetic field information of a magnetic circuit, comprised of a magnetic pole wheel (10), which is connectable to a shaft (41), and ferromagnetic first and second flux rings (14,16) equipped with teeth (18, 20), wherein the teeth (18, 20) extend in the radial direction of the shaft (41) in order to take a radial reading of the magnetic field information of the magnetic pole wheel (10), wherein the magnetic flux collecting element (22, 24) has a first shell (26) and second shell (20) that have different radii parallel to the first and second flux rings (14, 16), wherein the magnetic flux collecting element (22, 24) has a first shell (26) and second shell (20) that have different radii parallel to the first and second flux rings (14, 16), and wherein the teeth engage in one another in the radial direction, whereby the first and second flux rings extend in the axial direction with different radii.

2. The sensor system as recited in claim (1),
wherein first teeth (18) are connected to a first flux ring (14) and second teeth (20) are connected to a second flux ring (16).

3. The sensor system as recited in claim 1,
wherein radially oriented first and second teeth (18, 20) are spaced the same axial distance apart from the magnetic pole wheel (10).

4. The sensor system as recited in claim 1,
wherein a magnetic flux element (30) mechanically and magnetically connects the first shell (26) and second shell (28) to each other.

5. The sensor system as recited in claim 1,
wherein the shell (26, 28) has a tapered element (32) or molded element (54) for supplying the magnetic field to the sensor element (12) in a targeted fashion.

6. The sensor system as recited in claim 1,
wherein the tapered element (32) or molded element (54) and/or the shells (26, 28) is/are provided to remove heat from the sensor element (12).

7. The sensor system as recited in claim 1,
wherein the tapered element (32) or molded element (54) is situated in the immediate vicinity of the sensor element (12).

8. The sensor system as recited in claim 1,
wherein the first flux ring (14) is situated spaced axially apart from the second flux ring (16).

9. The sensor system as recited in claim 1,
wherein at least the sensor element (12) and/or the magnetic flux collecting element (22, 24) is situated so as to be stationary in relation to the flux ring (14, 16).

10. The sensor system as recited in claim 1,
wherein at least one magnetic flux yoke element (11) is situated on the side of the magnetic pole wheel (10) oriented away from the teeth (18, 20).

11. The sensor system as recited in claim 1,
wherein the magnetic flux yoke element (11) is part of a sleeve (52) that serves to fasten the magnetic pole wheel (10).

* * * * *